United States Patent
Yang et al.

(10) Patent No.: US 11,300,432 B1
(45) Date of Patent: Apr. 12, 2022

(54) THERMAL-DISPERSION TYPE THERMAL MASS FLOWMETER

(71) Applicant: FINETEK Co., Ltd., New Taipei (TW)

(72) Inventors: Yao-Hao Yang, New Taipei (TW); Hsin-Hung Lin, New Taipei (TW); Jia-Hao Kang, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 0 days.

(21) Appl. No.: 17/330,149

(22) Filed: May 25, 2021

(51) Int. Cl.
| | | |
|---|---|---|
| *G01F 1/684* | (2006.01) | |
| *G01K 1/16* | (2006.01) | |
| *G01K 7/16* | (2006.01) | |

(52) U.S. Cl.
CPC .............. *G01F 1/684* (2013.01); *G01K 1/16* (2013.01); *G01K 7/16* (2013.01)

(58) Field of Classification Search
CPC ............. G01F 1/684; G01K 1/16; G01K 7/16
See application file for complete search history.

(56) References Cited

U.S. PATENT DOCUMENTS

| | | | | | |
|---|---|---|---|---|---|
| 5,122,925 | A * | 6/1992 | Inpyn | ................... | H05K 7/1417 361/704 |
| 9,182,261 | B1 * | 11/2015 | Chen | ...................... | G01F 1/698 |
| 2007/0195857 | A1 * | 8/2007 | Krishnamurthy | ........ | G01K 1/16 374/148 |
| 2013/0152698 | A1 * | 6/2013 | Kurz | ...................... | G01F 15/08 73/861 |
| 2016/0103020 | A1 * | 4/2016 | Liehr | ................... | B23K 1/0008 374/183 |

FOREIGN PATENT DOCUMENTS

| | | | | |
|---|---|---|---|---|
| DE | 102007010912 | A1 * | 9/2008 | ............. G01F 1/684 |
| DE | 102015221458 | B3 * | 10/2016 | ........... B23K 1/0016 |
| EP | 1048935 | A2 * | 11/2000 | ............. G01F 1/696 |

\* cited by examiner

*Primary Examiner* — Ryan D Walsh
(74) *Attorney, Agent, or Firm* — Chun-Ming Shih; HDLS IPR Services

(57) ABSTRACT

This disclosure provides a thermal-dispersion type thermal mass flowmeter having a sleeve and a measuring module. Two ends of the sleeve are respectively a fixed end and a measuring end. The measuring module is accommodated in the sleeve. The measuring module has a bracket. A heater, a first temperature sensor, and a second temperature sensor are arranged on the bracket. The first temperature sensor is thermally connected to an internal surface of the sleeve, the second temperature sensor and the heater are thermally connected to the measuring end, and the second temperature sensor and the heater are arranged on the central axis of the sleeve.

6 Claims, 3 Drawing Sheets

THERMAL-DISPERSION TYPE THERMAL MASS FLOWMETER

BACKGROUND

Technical Field

This disclosure is related to a flow rate and a heat flux measurement, in particular to a thermal-dispersion type thermal mass flowmeter for deriving a flow rate or heat flux of in a flow field by measuring a temperature difference between two locations in the flow field.

Description of Related Art

Thermal-dispersion type flowmeter is a precise and reliable flow measuring device operating via thermal convection of fluid (gas, liquid, or mixture). The thermal-dispersion type flowmeter has a flow sensing probe, and the flow sensing probe is made of stainless steel or engineering plastic. The flow sensing probe contains two temperature sensors, one is heated so that a difference between the temperature measured by the two temperature sensors exists. When the thermal-dispersion type flowmeter is placed in a pipeline, the temperatures difference is inversely proportional to a flow volume of the fluid. Under a constant heating power, a mass flow rate of the fluid in the pipeline can be derived from the difference between the temperatures measured by the two sensors.

The thermal-dispersion type thermometer is operated on the basis of the thermal-dispersion type flowmeter. When the physical conversion value is output, that is multiplied by a conversion factor, which is usually related to viscosity, mass, specific heat capacity and enthalpy of the fluid, and a heat flux can be derived from the flow rate.

The thermal-dispersion type flow/thermometer (including continuous type and on-off type) has high sensitivity, unrestricted installation position, no wear with respect to movable mechanical structure, so that it can measure a fluid mixed with solid impurity, and can be made of various materials suitable for environmental measurement in liquids of various pH values. The flow sensing probe can be configured a length which is designed and manufactured corresponding to the diameter of the applied pipeline, so that it is suitable for both large diameter pipes and small diameter pipes.

One configuration of a related-art thermal-dispersion type flowmeter/thermometer is disposed corresponding to specific positions at upstream and downstream of the pipeline, a sensor capable of heating and measuring temperature is provided at one end and the other device capable of only measuring temperature without heating is provided at the other end. The temperatures at upstream and downstream are measured and further converted into the flow rate/heat in the pipeline. The aforementioned method is usually applied in a by-pass pipeline rather than a main pipeline. A ratio of the flow rates/heat measured in the by-pass pipeline and the main pipeline is derived from empirical formulas.

Another configuration of a related-art thermal-dispersion type flowmeter/thermometer is so called insertion type, namely a sensing probe is inserted into the main pipeline through an installation opening so as to measure the flow rate/heat in the main pipeline, and it is therefore convenient. The configuration provides two sensors in a sensing probe, and two sensors are respectively on two surfaces of a circuit board. The heater is disposed on one of the surfaces of the circuit board, and the circuit board is inserted in the sensing probe. The sensing probe further pierces into the pipeline through a lateral side of the pipeline. However, the two sensors of the related-art configuration are close and without sufficient thermal isolation, and the temperature difference between the two temperature sensors is therefore too small to cause error. In addition, the related-art sensing probe is subject to the direction of the two surfaces of the circuit board. If the sensing probe is turned related to the flow direction of fluid during installation, the position of the heater relative to the flow field is changed to be different from a status calibrated by the manufacturer. The thermal-dispersion type flowmeter should be installed in the pipeline according to the configuration of calibration, otherwise the measurement is inaccurate.

In views of this, in order to solve the above disadvantage, the inventor studied related technology and provided a reasonable and effective solution in this disclosure.

SUMMARY OF THE DISCLOSURE

This disclosure provides a thermal-dispersion type thermal mass flowmeter (probe).

This disclosure provides a thermal-dispersion type thermal mass flowmeter having a sleeve and a measuring module. Two ends of the sleeve are a fixed end and a measuring end respectively. The measuring module is accommodated in the sleeve. The measuring module has a bracket. A heater, a first temperature sensor and a second temperature sensor are provided on the bracket. The first temperature sensor is thermally connected to an internal surface of the sleeve, the second temperature sensor and the heater are thermally connected to the measuring end, and the second temperature sensor and the heater are disposed on a central axis of the sleeve.

According to the thermal-dispersion type thermal mass flowmeter of this disclosure, the bracket has a first plate and a second plate perpendicular to each other, the second plate is attached on an internal bottom of the measuring end, the first temperature sensor is arranged on the first plate, and the second temperature sensor and the heater are arranged on the second plate. The thermal-dispersion type thermal mass flowmeter of this disclosure further has a positioning tube inserted in the sleeve, the first plate is clamped between and an external surface of the positioning tube and the internal surface of the sleeve, the second plate is pressed by one end of the positioning tube to attach on the internal bottom of the measuring end. The thermal-dispersion type thermal mass flowmeter of this disclosure further has a pressing plate disposed in the fixed end to press the other end of the positioning tube and push the positioning tube toward the measuring end. A plurality of elastic arms are extended from a periphery of the pressing plate, the elastic arms respectively press on an internal surface of the fixed end to fix the pressing plate.

According to the thermal-dispersion type thermal mass flowmeter of this disclosure, the bracket is a flexible printed circuit board and the flexible printed circuit is bent to form the first plate and the second plate. The thermal-dispersion type thermal mass flowmeter of this disclosure further has a power wire, the other end of the sleeve is a fixed end in an opened manner, the power wire passes through the positioning tube from the fixed end of the sleeve to be connected with the second plate. The thermal-dispersion type thermal mass flowmeter of this disclosure further has a ground wire connected to the first plate. The thermal-dispersion type thermal mass flowmeter of this disclosure further has a pair of signal wires connected to the first plate to respectively connected to the first temperature sensor and the second temperature sensor.

According to the thermal-dispersion type thermal mass flowmeter of this disclosure, the fixed end is provided with an external thread.

According to the thermal-dispersion type thermal mass flowmeter of this disclosure, the heater and the second temperature sensor are disposed on the central axis of the sleeve, and the sleeve can be rotated to any position during a installing process, and the heater and the second temperature sensor can be maintained at a stable position related to the flow field. Accordingly, the thermal-dispersion type thermal mass flowmeter of this disclosure can be prevented from inaccuracy caused by installing deviation so that it is convenient to be installed and measures accurately.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
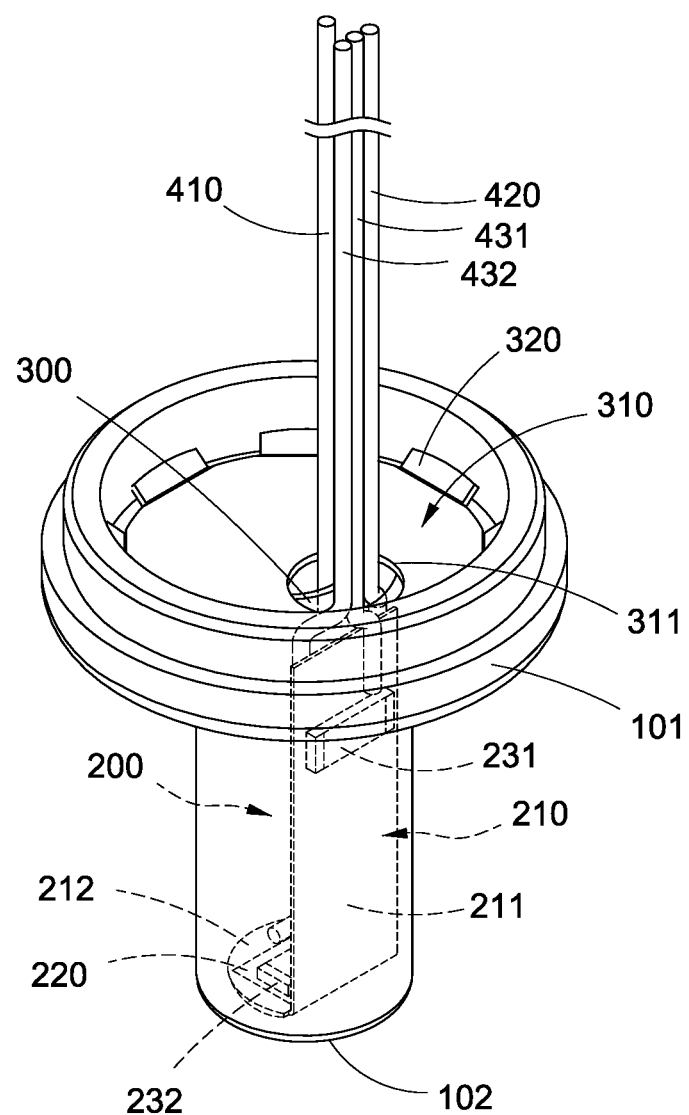
FIG. 1 is a perspective view showing the thermal-dispersion type thermal mass flowmeter according to an embodiment of this disclosure.
Figure 2:
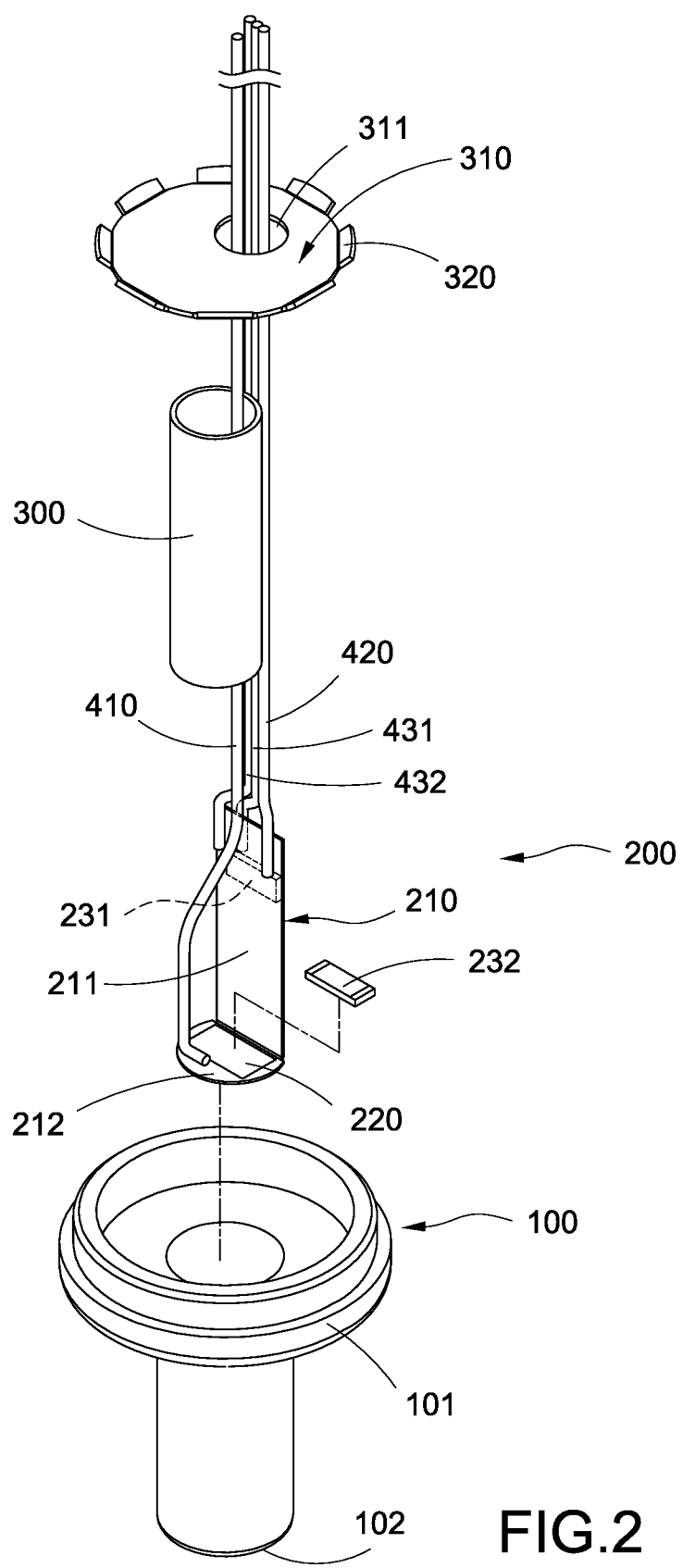
FIG. 2 is an exploded view showing the thermal-dispersion type thermal mass flowmeter according to the embodiment of this disclosure.
Figure 3:
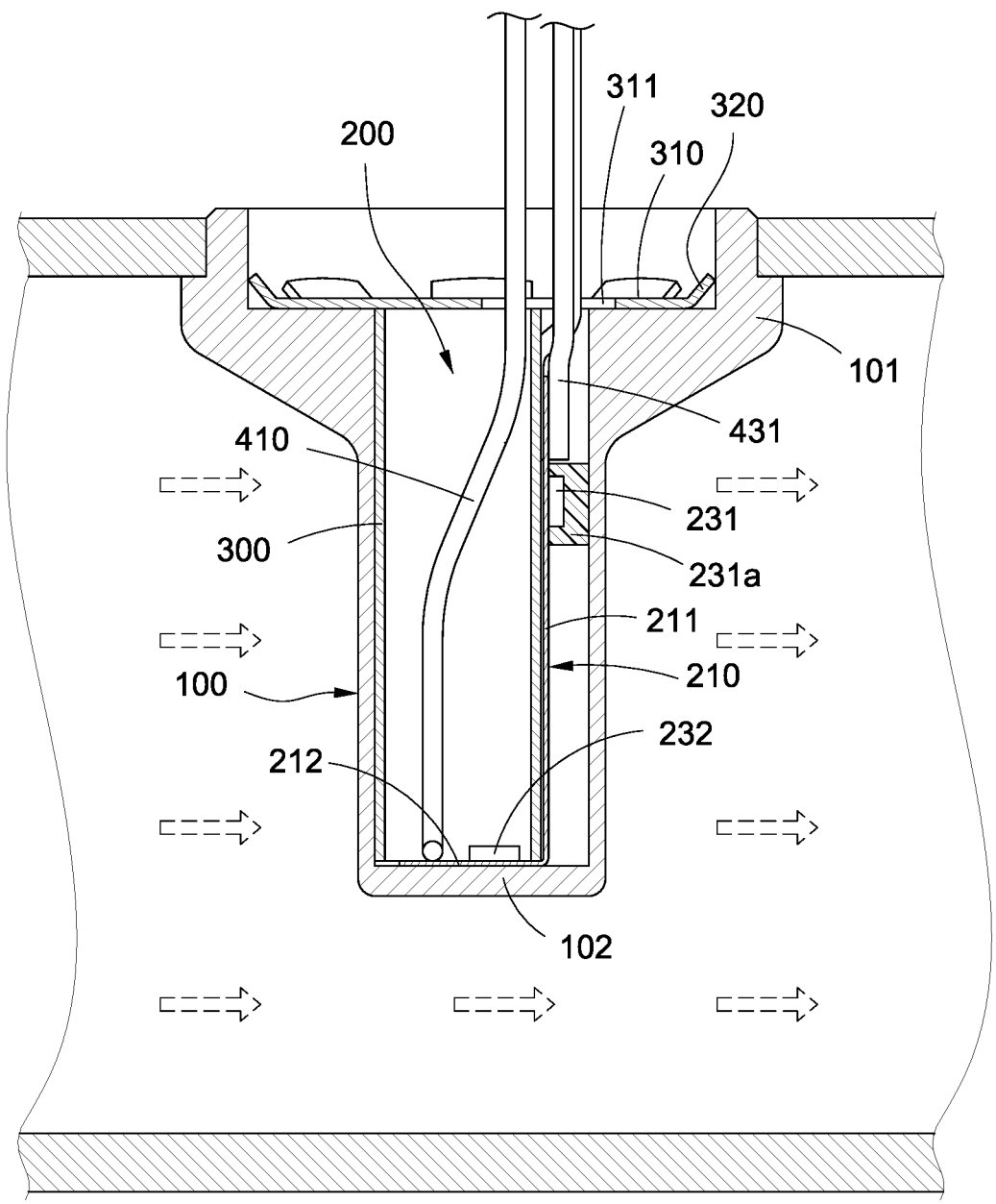
FIG. 3 is a schematic view showing the thermal-dispersion type thermal mass flowmeter in operation according to the embodiment of this disclosure.

According to FIGS. 1 to 3, a thermal-dispersion type thermal mass flowmeter for measuring a mass flux of a fluid in a pipeline is provided in an embodiment of this disclosure. According to this embodiment, the thermal-dispersion type thermal mass flowmeter of this disclosure has a sleeve 100 and a measuring module 200.

According to this embodiment, the sleeve 100 is a cylindrical tube made of metal or engineering plastic for transferring heat. Two ends of the sleeve 100 are respectively a fixed end 101 and a measuring end 102, the fixed end 101 of the sleeve 100 is opened, and the measuring end 102 of the sleeve 100 is closed. The sleeve 100 is inserted into the pipeline via a lateral side of the pipeline, the fixed end 101 is fixed on a wall of the pipeline, and the measuring end 102 is extended into the pipeline. In some embodiments, the fixed end 101 may be provided with an external thread so as to fastening the wall of the pipeline for convenience of installation. However, scope of this disclosure should not be limited to the embodiment.

The measuring module 200 is accommodated in the sleeve 100, the measuring module 200 has a bracket 210, and a heater 220, a first temperature sensor 231 and a second temperature sensor 232 are arranged on the bracket 210. The first temperature sensor 231 is thermally connected to an internal surface of the sleeve 100, the second temperature sensor 232 and the heater 220 are thermally connected to the measuring end 102, and the second temperature sensor 232 and the heater 220 are disposed on a central axis of the sleeve 100.

According to the thermal-dispersion type thermal mass flowmeter of this disclosure, the bracket 210 has a first plate 211 and a second plate 212 perpendicular to each other, the second plate 212 attaches on the internal bottom of the measuring end 102, the first temperature sensor 231 is arranged on the first plate 211 the second temperature sensor 232 and the heater 220 are arranged on the second plate 212. Specifically, the bracket 210 is an elongated flexible printed circuit board, and one end of the bracket 210 is bent to a right angle to form the second plate 212, the other portions of the bracket 210 forms the first plate 211, the heater 220 is a printed circuit disposed on the second plate 212 of the bracket 210. However, the bracket 210 of this disclosure should not be limited to the aforementioned embodiment. A segment of the flexible printed circuit board may be bent to be curve and the portions connected in front and back thereof form the first plate 211 and the second plate 212 perpendicular to each other. Moreover, the first plate 211 and second plate 212 may be two hard circuit boards perpendicular to each other.

The first plate 211 is inserted in the sleeve 100 to position the second plate 212 in the measuring end 102 of the sleeve 100. In some embodiments, the thermal-dispersion type thermal mass flowmeter of this disclosure further has a positioning tube 300, the positioning tube 300 is inserted in the sleeve 100, the first plate 211 is clamped between an external surface of the positioning tube 300 and an internal surface of the sleeve 100 so that the first temperature sensor 231 presses on and thermally connects to the internal surface of the sleeve 100, and the environment temperature of the flow field can be measured. A thermal paste 231a or a thermal pad may be provided between the first temperature sensor 231 and the internal surface of the sleeve 100 for increasing heat conductive efficiency. One end of the positioning tube 300 presses on the second plate 212 to attach the second plate 212 on the internal surface of the measuring end 102. The thermal-dispersion type thermal mass flowmeter of this disclosure further has a pressing plate 310, the pressing plate 310 is arranged in the fixed end 101 and presses the other end of the positioning tube 300 to push the positioning tube 300 toward the measuring end 102. According to this embodiment, a plurality of elastic arms 320 are extended from a periphery of the pressing plate 310. When the pressing plate 310 is inserted in the fixed end 101 of the sleeve 100, the respective elastic arms 320 presses the internal surface of the fixed end 101 to fix the pressing plate 310 to press the positioning tube 300.

The thermal-dispersion type thermal mass flowmeter of this disclosure further has a power wire 410, a ground wire 420 and a pair of signal wires 431/432 for controlling, heating and measurement. The power wire 410, the ground wire 420 and the signal wires 431/432 are inserted into the sleeve 100 through the fixed end 101 of the sleeve 100. The power wire 410 passes through positioning tube 300 from the fixed end 101 of the sleeve 100 to connect to the second plate 212, the ground wire 420 is connected to the first plate 211, the power wire 410 is used for supplying power to the heater 220. The signal wires 431/432 are connected to the first plate 211 and electrically connected to the first temperature sensor 231 and the second temperature sensor 232 respectively for outputting the measured temperature signal.

Furthermore, an opening 311 is defined on the pressing plate 310 allowing the power wire 410, the ground wire 420 and the signal wires 431/432 to be inserted therethrough. Moreover, a diameter of the opening 311 is less than a diameter of the positioning tube 300 to prevent the positioning tube 300 from loosening by protruding from the opening 311.

According to the thermal-dispersion type thermal mass flowmeter of this embodiment, the heater 220 and the second temperature sensor 232 are arranged on the central axis of the sleeve 100, and the sleeve 100 can be rotated to any position during an installing process, and the heater 220 and the second temperature sensor 232 can be maintained at a stable position related to the flow field. Accordingly, the thermal-dispersion type thermal mass flowmeter of this disclosure can be prevented from inaccuracy caused by installing deviation so that it is convenient to install and accurate.

While this disclosure has been described by means of specific embodiments, numerous modifications and variations may be made thereto by those skilled in the art without departing from the scope and spirit of this disclosure set forth in the claims.

What is claimed is:

1. A thermal-dispersion type thermal mass flowmeter, comprising:
    a sleeve, one end thereof being a measuring end in a closed manner;
    a measuring module, accommodated in the sleeve and comprising a bracket, and a heater, a first temperature sensor and a second temperature sensor disposed on the bracket; and
    a positioning tube, inserted in the sleeve,
    wherein the first temperature sensor is thermally connected to an internal surface of the sleeve, the second temperature sensor and the heater are thermally connected to the measuring end, and the second temperature sensor and the heater are disposed on a central axis of the sleeve,
    wherein the bracket comprises a first plate and a second plate perpendicular to each other, the second plate is attached on an internal bottom of the measuring end, the first temperature sensor is arranged on the first plate, and the second temperature sensor and the heater are arranged on the second plate, and
    the first plate is clamped between an external surface of the positioning tube and the internal surface of the sleeve, the second plate is pressed by one end of the positioning tube to attach on the internal bottom of the measuring end.

2. The thermal-dispersion type thermal mass flowmeter according to claim 1, further comprising: a pressing plate, the other end of the sleeve being a fixed end in an opened manner, the pressing plate being disposed in the fixed end to press the other end of the positioning tube and push the positioning tube toward the measuring end, wherein a plurality of elastic arms are extended from a periphery of the pressing plate, the elastic arms respectively press on an internal surface of the fixed end to fix the pressing plate.

3. The thermal-dispersion type thermal mass flowmeter according to claim 1, wherein the bracket comprises a flexible printed circuit board bent to form the first plate and the second plate.

4. The thermal-dispersion type thermal mass flowmeter according to claim 3, further comprising: a positioning tube, inserted in the sleeve, the first plate being clamped between an external surface of the positioning tube and the internal surface of the sleeve, the second plate being pressed by one end of the positioning tube to attach on the internal bottom of the measuring end.

5. The thermal-dispersion type thermal mass flowmeter according to claim 1, further comprising: a power wire, the other end of the sleeve being a fixed end in an opened manner, the power wire passing through the positioning tube from the fixed end of the sleeve to be connected with the second plate.

6. The thermal-dispersion type thermal mass flowmeter according to claim 1, further comprising: a ground wire and a pair of signal wires, wherein the ground wire is connected to the first plate, and the pair of signal wires are connected to the first plate to electrically connected to the first temperature sensor and the second temperature sensor respectively.

* * * * *